July 20, 1965    M. P. AVERY    3,195,175
CHICKEN PICKING FINGER
Filed May 3, 1962    2 Sheets-Sheet 2
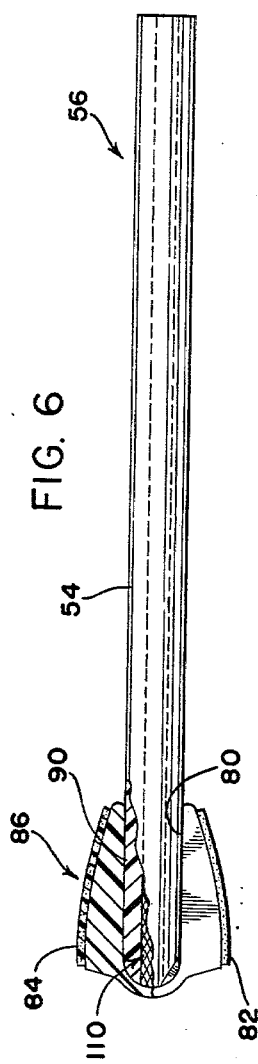
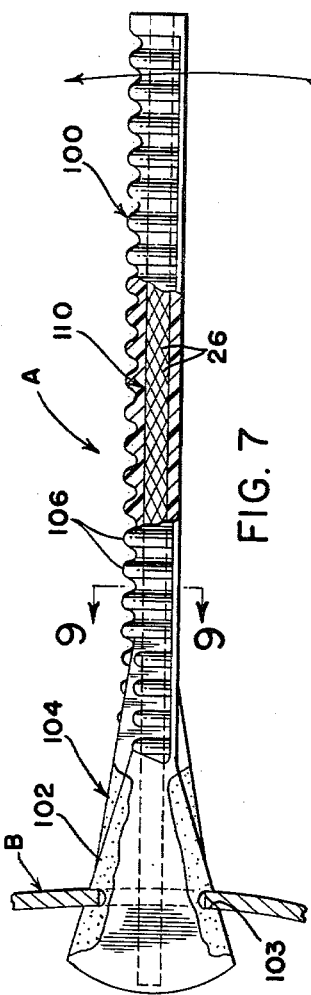
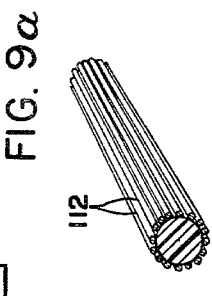
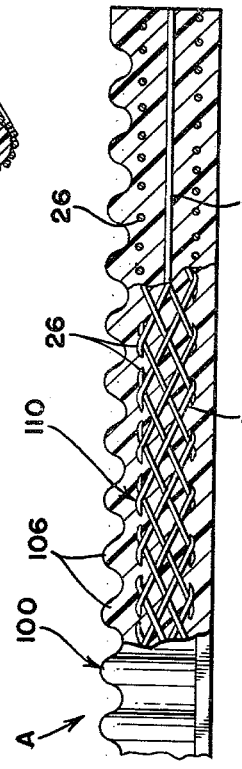
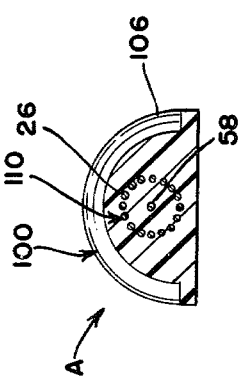
INVENTOR.
MALCOLM P. AVERY
BY Alfred C. Brely
ATTORNEY

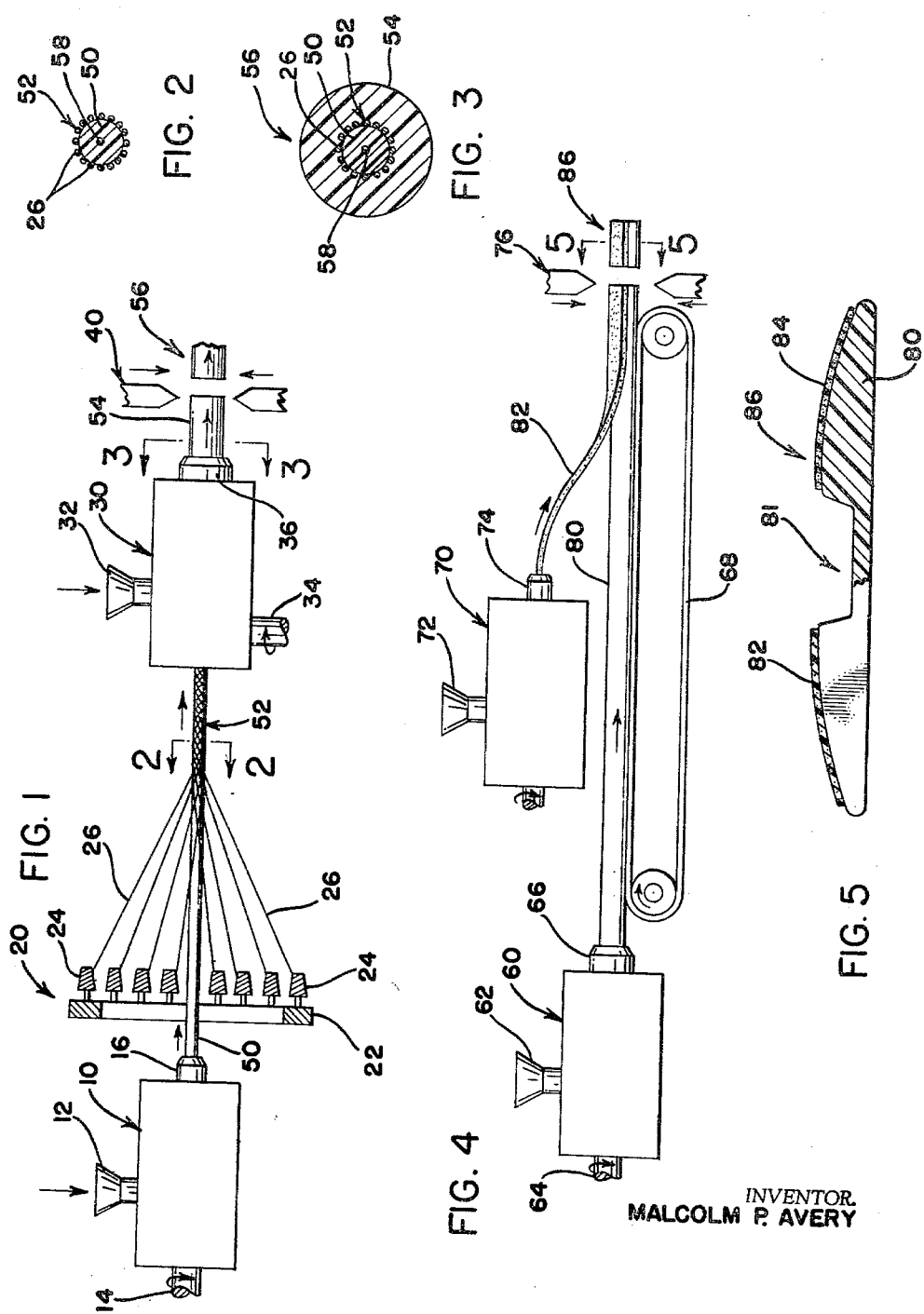

United States Patent Office 3,195,175
Patented July 20, 1965

3,195,175
CHICKEN PICKING FINGER
Malcolm P. Avery, Bedford, Ohio, assignor to The Stalwart Rubber Company, Bedford, Ohio, a corporation of Ohio
Filed May 3, 1962, Ser. No. 192,141
9 Claims. (Cl. 17—11.1)

The present invention relates to the art of chicken picking and more particularly to an improved finger for use in chicken picking The present invention is particularly applicable to removing feathers from a chicken carcass and it will be discussed with reference thereto; however, it is to be appreciated that the invention has much broader applications and may be used for removing the feathers of various fowls. Further, the invention may be used for removing hair from the carcass of animals such as pigs with only slight structural modifications.

It has become common practice to pick the feathers from a chicken by supporting the carcass of the chicken adjacent a high speed rotating frame having a plurality of radially extending, flexible fingers so that the fingers flagellate the carcass and rip the feathers therefrom. Such an operation places a substantial strain on the flexible fingers, and they frequently fail which necessitates shutdown of the picking machine and replacement of the defective fingers. Because of the intricate shape of the fingers required to effectively strip the chicken of all feathers and the various steps required in the manufacture of the fingers, the fingers are relatively expensive and frequent replacent thereof adds considerably to the cost of the picking operation.

To increase the life and improve the operation of the chicken picking fingers, it is known to embed an essentially non-elastic material within an elastic material forming the major portion of the chicken picking finger so that the non-elastic material is substantially coextensive with the length of the finger and is positioned in a single layer. Such a reinforced chicken picking finger is disclosed in the copending application Serial No. 83,294 filed January 17, 1961, by John J. Kravetz and Arnold W. MacAlonan, and now Patent No. 3,124,832. The present invention is an improvement of the reinforced chicken picking finger disclosed in that copending application and contemplates a chicken picking finger with a novel reinforcing structure.

In accordance with the present invention there is provided a chicken picking finger comprising an elongated length of soft elastic material and a flexible reinforcing sleeve embedded within the material and generally coextensive with the length thereof. In a somewhat limited, but important, aspect of the invention, the sleeve is comprised of a plurality of non-elastic fibers or strands arranged in a pattern, e.g. a helix, to permit a limited degree of longitudinal extension of the finger.

The primary object of the present invention is the provision of a chicken picking finger of the type comprising an elongated length of elastic material which finger has a longer useful life than prior fingers of this type.

Another object of the present invention is the provision of a chicken picking finger of the type comprising an elongated length of elastic material which finger has an increased resistance to breakage.

Still another object of the present invention is the provision of a chicken picking finger of the type comprising an elongated length of elastic material which finger has a reinforcing sleeve embedded within and coextensive with a portion of the elastic material.

Still another object of the present invention is the provision of a chicken picking finger of the type comprising an elongated length of elastic material which finger is flexible in a direction transverse to its length and substantially non-elastic in a direction longitudinal to its length.

Another object of the present invention is the provision of a chicken picking finger of the type comprising an elongated length of elastic material which finger includes a reinforcing sleeve comprising a plurality of non-elastic strands arranged in a pattern to permit a controlled amount of longtitudinal extension of the finger.

Yet another object of the present invention is the provision of a chicken picking finger of the type comprising an elongated length of elastic material which finger includes a reinforcing sleeve of braided non-elastic strands embedded within the finger and coextensive therewith.

Another object of the present invention is the provision of a chicken picking finger of the type comprising an elongated length of elastic material which finger includes a group of non-elastic strands embedded therein and forming a sleeve-like reinforcing member.

Still another object of the present invention is the provision of a chicken picking finger which is relatively inexpensive and has an increased useful life.

These and other objects and advantages will become apparent from the following description used to illustrate the preferred embodiment of the invention as read in connection with the accompanying drawings in which:

FIG. 1 is a somewhat schematic side elevation disclosing the method of manufacturing the chicken picking finger;

FIG. 2 is an enlarged cross sectional view taken along the line 2—2 of FIG. 1;

FIG. 3 is an enlarged cross sectional view taken along line 3—3 of FIG. 1;

FIG. 4 is a somewhat schematic side elevational view illustrating further steps in the method of manufacturing the chicken picking finger;

FIG. 5 is an enlarged cross sectional view taken along line 5—5 of FIG. 4;

FIG. 6 is a side elevational view partly in section illustrating the chicken picking finger before being molded;

FIG. 7 is a partially cross sectioned side elevational view illustrating the preferred embodiment of the present invention;

FIG. 8 is a longitudinal view sectioned at two different planes illustrating the preferred embodiment of the present invention as shown in FIG. 7.

FIG. 9 is a cross sectional view taken along line 9—9 of FIG. 7; and

FIG. 9a is a pictorial view illustrating a modification of the preferred embodiment.

Referring now to the drawings, wherein the showings are for the purpose of illustrating preferred embodiments of the invention only and not for the purpose of limiting same, FIGS. 1 and 4 show schematically a method of manufacturing a length or blank of elastic material to be molded into a chicken picking finger by an appropriate molding device. To manufacture the mold charge or blank for the chicken picking finger, there is provided a core extruder 10 having an inlet 12 for feeding a material which may be cured into an elastic body, a drive shaft 14 for operating the extruder and an outlet nozzle 16 for extruding the uncured core in the direction of the arrow adjacent the nozzle. Spaced slightly forward of nozzle 16 is a braider 20 comprising a rotatable bobbin frame 22 having a plurality of bobbins 24 for paying out non-elastic strands 26. On the opposite side of braider 20 from the extruder 10 is a second extruder 30 having an inlet 32 for a material which may be secured into an elastic mass, a drive shaft 34 for operating the extruder and an outlet nozzle 36 for extruding the curable material in a direction indicated by the arrow adjacent nozzle 36. At the outlet end of extruder 30 there is provided a schematically represented cutoff 40.

In operation, the extruder 10 produces a core 50 of curable material; the braider 20 braids a sleeve of non-elastic strands 26 onto the outer surface of the extruded core 50 (see FIG. 2); extruder 30, thereafter extrudes onto the braided sleeve 52 a layer 54 of curable material having a composition, if not identical to, substantially compatible with the material of core 50; and the cutoff 40 cuts the extrusion issuing from extruder 30 into lengths or blanks 56 which are used to mold the body portion of a chicken picking finger in a manner to be hereinafter described. It is to be appreciated that the steps need not be continuous; to the contrary, the core 50 may be coiled onto a reel as it leaves the extruder 10 for later braiding of the sleeve 52 thereon. In accordance with the preferred embodiment of the invention, a strand 58 is extruded with the core 50 to prevent undue elongation of the core during subsequent processing. The cross section of the body blank 56, as shown in FIG. 3, comprises the inner core 50 with strand 58 therein, sleeve 52 and outer layer 54 which layer flows around the strands 26 of sleeve 52 and into engagement with the uncured core 50. The length of the blank 56 is determined by the desired length of the chicken picking finger to be manufactured therefrom and the dimension of the blank forms no part of the present invention.

The blank to be molded into the base portion of the chicken picking finger is produced by the method schematically illustrated in FIG. 4. As is shown, a base extruder 60 having an inlet 62 for receiving a material adapted to be cured into an elastic mass, a drive shaft 64 for operating the extruder and an outlet nozzle 66 for forming the desired contour onto the blank used in molding the base of the finger. As the material issues from the end of the extruder 60, it may be deposited on a moving conveyor 68 so that extruder 70 having an inlet 72 for a curable material and outlet nozzle 74 may deposit an uncured mass of distinctively colored material onto the extruded material coming from extruder 60. A cutoff 76 is adapted to cut the extruded material into the desired lengths. Referring now to FIG. 5, the material issuing from extruder 60 forms a base extrusion 80 having a central recess 81. The material issuing from extruder 70 forms two outer layers 82, 84 on opposite sides of recess 81 and because the material of layers 82, 84 is different in color from the material in extrusion 80, these two layers form a code to indicate the particular type of chicken picking finger being manufactured. Accordingly, as the construction of the chicken picking finger is changed, this may be indicated by changing the color of layers 82, 84. The cutoff 76 forms base blanks 86 having a width approximately equal to the diameter of body blank 56.

Referring to FIG. 6, the base blank 86 is wrapped around one end of body blank 56 and secured thereto by an adhesive at the joint 90. A variety of adhesives may be used without departing from the intended scope of the present invention and the inherent tackiness of uncured material may possibly be used. The resulting finger blank shown in FIG. 6 is placed within a mold having the desired shape of the chicken picking finger and by a curing process, which is a vulcanizing step in the case of rubber material, the materials of the blanks 56, 86 are formed into an integral chicken picking finger having any desired outer shape.

Although the chicken picking finger may assume a variety of configurations, in accordance with the preferred embodiment, the body and base blanks are molded into a finger A adapted to be mounted within an aperture of a frame B as shown in FIG. 7. In essence, the finger A comprises a generally elongated elastic body 100 and a base 104 having appropriate notches or grooves 103 adapted to mount the finger A onto the frame B and an outer surface 102 of colored material to indicate the construction of the particular finger. The outer shape or configuration of the chicken picking finger A forms no part of the present invention and, in the preferred embodiment, is characterized basically by having a plurality of spaced generally semi-circular ribs 106 which are adapted to strip the feathers from the carcass of a chicken as the fingers are moved in the arcuate direction indicated by the arrow 114 in FIG. 7. In accordance with the present invention there is provided a novel reinforcing construction for the chicken picking finger A which reinforcing construction comprises a sleeve 110 of braided non-elastic strands 26 which sleeve corresponds with the braided sleeve 52 of FIGS. 1–3. After the body blank 56 is molded into finger body 100 the braided sleeve 110 is completely embedded within the body and is coextensive with the length thereof (see FIG. 8). Each of the strands 26 are encircled by the cured plastic material of the body 100 to provide a physical bond between the strands and the elastic material of the body. By this construction, as the finger A is rotated at a high speed, the finger is supported in the longitudinal direction against the centrifugal force exerted thereon. There may be a tendency for the body 100 to elongate slightly because the strands 26 forming sleeve 110 can contract to a limited degree against the inner core of the body. Abrupt stretching forces on the body 100 are absorbed with less shock than in a finger wherein a straight strand of non-elastic reinforcing material is coextensive with the lengths of the body 100. To accomplish this function, in essence, the strands 26 are arranged in a pattern that allows slight elongation of the sleeve 110 and, therefore, permits elongation of the finger body 100. A variety of patterns could be used to allow slight elongation of the sleeve; however, in the preferred embodiment, strands 26 are arranged in a helix so that the sleeve may elongate as it collapses on the core 50. The helix configuration of the strands may be provided by various arrangements; however, the strands are braided in the preferred embodiment which greatly reduces the tendency of the strands to unravel during manufacturing.

Referring to FIG. 9, the sleeve 110 comprised of non-elastic strands 26 has a generally circular cross sectional configuration. This configuration results from braiding the strands 26 around a circular extrusion, i.e. core 50, as shown in FIG. 2. It is within the contemplation of the invention to provide other configurations of the sleeve 110; for instance, if the core 50 were elliptical, rectangular or square in cross section the shape of the braided sleeve 110 would correspond to these shapes and would not be circular as shown in FIG. 9. Accordingly, the present invention is not anticipated to be limited to the circular shape of the sleeve 110; but, the term "sleeve" is to be interpreted as a generic term defining a generally closed tubular configuration having various cross sectional shapes. It is possible to provide a plurality of straight strands 112 arranged onto a generally circular core as is shown in FIG. 9a. Accordingly, an outer layer of curable material could be extruded over the strands 112 and cured into a chicken picking finger similar to finger A, although it is provided with a plurality of straight strands defining the reinforcing sleeve. Of course, the strands may be spiraled around the core without actually being braided as shown in the preferred embodiment disclosed in FIGS. 7–9. By constructing the sleeve within the chicken picking finger in accordance with the disclosure of FIG. 9a, the strands could be passed through an extruder while both the internal and external material was being simultaneously extruded around the strands. In this manner, the blank 56 could possibly be provided by a single extruding operation.

It has been found that a chicken picking finger constructed in accordance with the present invention has a substantially longer life than other chicken picking fingers. As small cracks develop on body 100 they can progress only a slight distance into the finger body without being stopped or their progression retarded by the sleeve 110. Accordingly, small cracks do not develop rapidly into detrimental defects. This is a substantial improvement over any known chicken picking finger. Also, it has been found that a chicken picking finger constructed in accordance with the present invention has substantially increased the finger life of chicken pickers at speeds in the range of 850 r.p.m. Accordingly, at greater picking speeds the failure rate of the chicken picking fingers is substantially reduced.

The present invention has been described in connection with certain structural embodiments; however, it is to be appreciated that the invention is not so limited and various modifications may be made without departing from the intended spirit and scope of the invention as defined in the appended claims.

Having thus described my invention, I claim:

1. A chicken picking finger comprising an elongated body of soft elastic material and a transversely flexible, reinforcing sleeve embedded within said body and extending in the direction of elongation of said body, said sleeve comprising a plurality of strands, said strands being embedded within and bonded to said soft material and said strands having a high modulus of elasticity as compared to the soft material of said body.

2. A chicken picking finger comprising an elongated body of soft elastic material and a transversely flexible, reinforcing sleeve embedded within said body and extending in the direction of elongation of said body, said sleeve comprising a plurality of strands, said strands being embedded within and bonded to said soft material, said strands having a high modulus of elasticity as compared to the soft material of said body, and said strands forming a helix having an axis coaxial with said body.

3. A chicken picking finger as defined in claim 2 wherein said strands are braided.

4. A chicken picking finger as defined in claim 3 wherein said sleeve is circular in cross-section.

5. A chicken picking finger as defined in claim 2 wherein said sleeve is circular in cross-section.

6. A chicken picking finger as defined in claim 2 including a central, elongated reinforcing strand embedded within and bonded to said soft material, said central strand being co-terminous with said sleeve and having a high modulus of elasticity as compared to the soft material and said central strand being positioned generally on the axis of said sleeve.

7. A chicken picking finger as defined in claim 1 wherein said strands are spaced with respect to each other by said soft material.

8. A chicken picking finger as defined in claim 7 wherein said strands extend longitudinally of the length of said body.

9. A chicken picking finger as defined in claim 1 wherein said sleeve is circular in cross-section.

References Cited by the Examiner

UNITED STATES PATENTS

| | | | |
|---|---|---|---|
| 1,657,300 | 1/28 | Delzell | 74—233 |
| 2,683,282 | 7/54 | McKinley et al. | 17—11.1 |
| 2,684,318 | 7/54 | Meek | 156—180 |
| 2,690,985 | 10/54 | Poole | 74—233 |
| 2,758,334 | 8/56 | Adams et al. | 17—18 |
| 2,914,794 | 12/59 | Barker et al. | 17—11.1 |
| 2,974,713 | 3/61 | Hydrick | 156—149 |
| 3,124,832 | 3/64 | Kravetz et al. | 17—11.1 |

SAMUEL KOREN, *Primary Examiner.*

ARNOLD RUEGG, LUCIE H. LAUDENSLAGER, *Examiners.*